(12) United States Patent
Smaragdis et al.

(10) Patent No.: US 8,724,798 B2
(45) Date of Patent: May 13, 2014

(54) SYSTEM AND METHOD FOR ACOUSTIC ECHO CANCELLATION USING SPECTRAL DECOMPOSITION

(75) Inventors: Paris Smaragdis, Brookline, MA (US); Gautham J. Mysore, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 701 days.

(21) Appl. No.: 12/623,328

(22) Filed: Nov. 20, 2009

(65) Prior Publication Data

US 2013/0121497 A1    May 16, 2013

(51) Int. Cl.
*H04M 9/08* (2006.01)
(52) U.S. Cl.
USPC .............. 379/406.05; 379/406.09; 379/406.1; 379/406.11; 379/406.12
(58) Field of Classification Search
USPC ........................................ 379/406.01–406.16
See application file for complete search history.

(56) References Cited

U.S. PATENT DOCUMENTS

| | | | |
|---|---|---|---|
| 5,272,695 A | | 12/1993 | Makino et al. |
| 5,323,459 A | | 6/1994 | Hirano |
| 5,363,441 A | | 11/1994 | Feiner et al. |
| 5,555,310 A | | 9/1996 | Minami et al. |
| 5,721,782 A | | 2/1998 | Piket et al. |
| 5,774,561 A | | 6/1998 | Nakagawa et al. |
| 5,960,077 A | | 9/1999 | Ishii et al. |
| 6,108,413 A | * | 8/2000 | Capman et al. .......... 379/406.13 |
| 6,246,760 B1 | | 6/2001 | Makino et al. |
| 6,556,682 B1 | | 4/2003 | Gilloire et al. |
| 2004/0264686 A1 | * | 12/2004 | Enzner ..................... 379/406.08 |
| 2006/0222172 A1 | * | 10/2006 | Chhetri et al. ........... 379/406.05 |
| 2009/0323924 A1 | * | 12/2009 | Tashev et al. ............ 379/406.05 |

OTHER PUBLICATIONS

Smaragdis,P,B.Raj,andM.V.Shashanka."Sparse and Shift-Invariant Feature Extraction from Non-Negative Data". InProc. IEEE International Conference on Audio and Speech Signal Processing, 2008.
Smaragdis,P."Convolutive Speech Bases and their Application to Supervised Speech Separation",IEEE Trans. on Audio, Speech and Language Processing, vol. 15, Issue1, pp. 1-12, Jan. 2007.
Virtanen,T."Separation of Sound Sources by Convolutive Sparse Coding", in Proc. Workshopon Statistical and Perceptual Audition 2004.
Cahill,N. andR.Lawlor."A NovelApproach to Acoustic Echo Cancellation",In Proc. European Signal Processing Conference 2008.
Kameoka,H.,T.Nakatani,T.Yoshioka."Robust Speech Dereverberation Based on Non-negativity and Sparse Nature of Speech Spectrograms", In Proc. IEEE International Conference on Acoustics ,Speech and Signal Processing,2008.

* cited by examiner

*Primary Examiner* — Sonia Gay
(74) *Attorney, Agent, or Firm* — Wolfe-SBMC

(57) ABSTRACT

A method and apparatus for canceling an echo in audio communication is disclosed. The method comprises receiving an audio signal from a network and subsequently detecting a mixture audio signal comprising a target audio signal and an echo audio signal, the echo signal corresponding to the received audio signal. The method then comprises estimating the target audio signal by determining magnitude spectrograms for the mixture and received audio signals respectively, estimating a magnitude spectrogram of the target audio signal dependent on those of the mixture and received audio signal, and generating an output audio signal that estimates the target audio signal, the output audio signal being dependent on the estimated magnitude spectrogram.

20 Claims, 6 Drawing Sheets

SYSTEM AND METHOD FOR ACOUSTIC ECHO CANCELLATION USING SPECTRAL DECOMPOSITION

BACKGROUND

Modern audio communication devices, such as telephones and computers, are often configured to receive audio data from a remote network source and to audibilize that audio data using one or more speakers. Such devices are often also equipped with one or more microphones configured to capture local audio data that the communication device can communicate to the remote source over the network.

A classic problem with such devices is that of audio echo. That is, when audio data received from a remote source is audibilized through a speaker of the communication device, the microphone on the communication device may detect this audibilized data and in response, the communication device transmits the received audio data back to the remote source, resulting in an echo effect.

The problem is further complicated when the microphone detects both audio data from the speaker and audio data from a local source (e.g., the telephone user speaking). In such cases, it is desirable for the device to transmit only the audio data from the local source and not to echo the audio data from the microphone.

To mitigate this effect, communication devices and/or microphones have been configured to utilize various echo cancellation techniques. The objective of such techniques is to eliminate a known source (received audio data) after it has undergone a transformation and is then mixed with another new source (locally produced audio).

Traditional approaches to echo cancellation focus on the idea of a canceller that assumes the received signal will undergo a linear transformation before being re-recorded by the microphone. This linear transformation accounts for propagation delay, the speaker/microphone frequency response, and the environment in which the recording takes place. An adaptive filter may be used to model these effects and the output is then subtracted from the observed mixture to suppress the echo portion of the return signal. However, such approaches present various shortcomings in practical deployment. For example, the filter must dynamically adjust to continuously changing mixing conditions (such as changes in the channel and/or environment response) and it cannot adapt effectively while both ends simultaneously produce sound. To solve these problems, more advanced echo cancellation techniques are required.

SUMMARY

A method and apparatus for canceling an echo in audio communication is disclosed. The method comprises receiving an audio signal from a network and subsequently detecting a mixture audio signal comprising a target audio signal and an echo audio signal, the echo signal corresponding to the received audio signal. The method then comprises estimating the target audio signal by determining magnitude spectrograms for the mixture and received audio signals respectively, estimating a magnitude spectrogram of the target audio signal dependent on those of the mixture and received audio signal, and generating an output audio signal that estimates the target audio signal, the output audio signal being dependent on the estimated magnitude spectrogram.

In different embodiments, the apparatus may be implemented as an endpoint communication device (e.g., telephone, cell phone, personal computer, etc.) or as an intermediary between endpoint communication devices (e.g., a VoIP server). Each of the magnitude spectrograms may describe a spectral density distribution of the corresponding audio signal and not phase information. In some embodiments, estimating the magnitude spectrogram of the target audio signal is dependent on a magnitude spectral model of the magnitude spectrogram of the mixture audio signal. In such embodiments, the magnitude spectral model comprises a plurality of magnitude spectral components being combined to produce the magnitude spectrogram of the mixture audio signal.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Audio communication devices (e.g., telephones, computers executing audio conferencing software, etc.) are often configured to receive an audio signal from a remote party over a network and to audibilize that signal, such as by playing it through one or more speakers. Such communication devices may also include an audio detection unit (e.g., microphone) configured to capture local audio signals for communication to the remote party. When the audio detection unit captures elements of the audibilized audio signal sent by the remote party and causes those elements to be transmitted back to that remote party, the remote party may experience an undesirable echo effect.

According to various embodiments, one or more devices involved in audio communication exchange may be configured to mitigate the echo effects described above by applying echo cancellation techniques, which may be based on source separation of a received mixture signal, operating in the magnitude spectral domain. In some embodiments, an end-user communication device, such as a telephone or personal computer executing audio communication software, may be configured to detect and mitigate echo effects. In other embodiments, wherein audio communication between two parties is facilitated though a separate third-party server (e.g., web server), the server may be configured to mitigate echo effects, as described herein.

Figure 1:
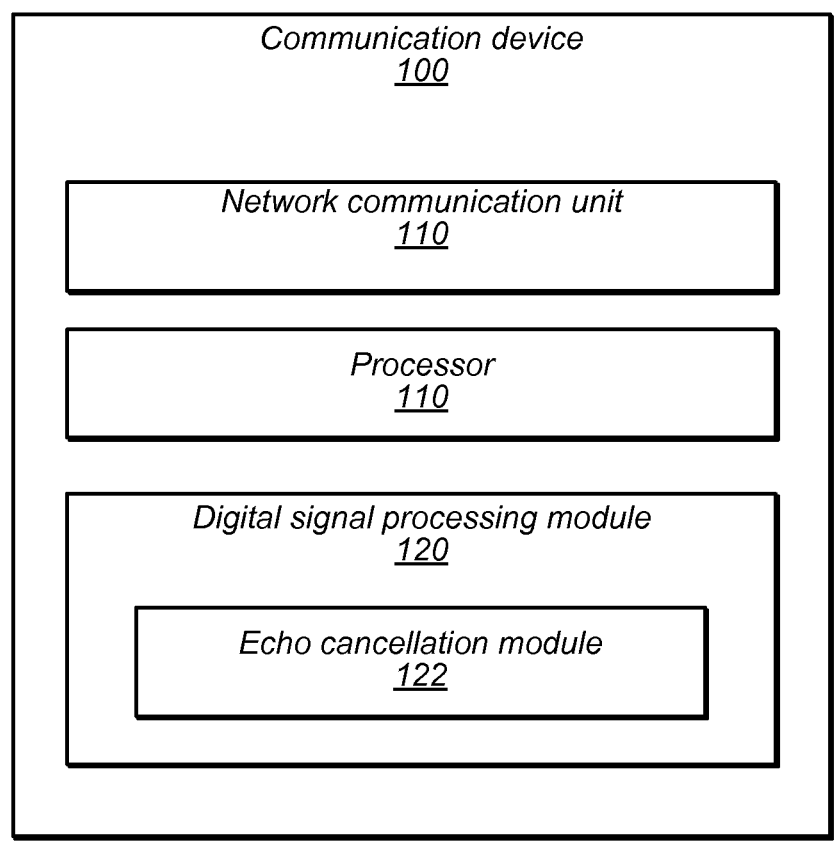
FIG. 1 is a block diagram illustrating the components of a communication device configured to perform echo cancellation, according to various embodiments.

FIG. 1 is a block diagram illustrating the components of a communication device configured to perform echo cancellation, according to various embodiments. In different embodiments, the communication device may be implemented by any of a computer system, central server, telephone, cellular telephone, or other communication device.

In the illustrated embodiment, communication device 100 comprises network communication unit 110 for sending and receiving audio signal data across a network. As used herein, the term audio signal or audio signal data refers to any data representing a sound or sequence of sounds over time. Audio signals may be stored in different forms and/or mediums. For example, a human voice may produce an audio signal in sound wave form. The same audio signal may be captured by a computer system using a microphone and stored in a digital form and/or transmitted over a network to another computer system.

In various embodiments, network communication unit 110 may be configured to communicate over various IP networks (e.g., Internet, intranet, WAN, LAN, Wi-Fi), telephone networks, cellular networks, wired networks, radio, over space using carrier waves or signals, or any other network capable of carrying audio signals. For example, in embodiments wherein communication device 100 is implemented as part of a computer system executing audio conferencing software, network communication unit 110 may be configured to send and receive audio signal data across an IP network (i.e., Voice over IP) using various protocols (e.g., TCP, UDP, etc.). In other embodiments, the communication device and/or network may be implemented in various other scenarios, as described above.

In the illustrated embodiment of FIG. 1, communication device 100 further includes processor 110 for executing program instructions to perform echo cancellation as described herein. For example, processor 110 may execute various routines and/or functions of digital signal processing module 120 to process an audio signal. In various embodiments, this processing may include converting the audio signal from analog to digital form and/or performing various manipulations on the signal. For example, digital signal processing module 120 may utilize echo cancellation module 122 to mitigate echo artifacts in a given audio signal. In various embodiments, echo cancellation module may be implemented as part of or separate from digital signal processing module 120.

As described above, communication device 100 may be implemented variously as an endpoint communication device (e.g., telephone, personal computer) or as an intermediary between endpoint communication devices (e.g., a VoIP server). For purposes of clarity, many of the embodiments described herein are concerned with performing echo cancellation on an endpoint communication device. However, it will be evident to those skilled in the art that the techniques may also be applied to an intermediary device, such as a server.

Figure 2:
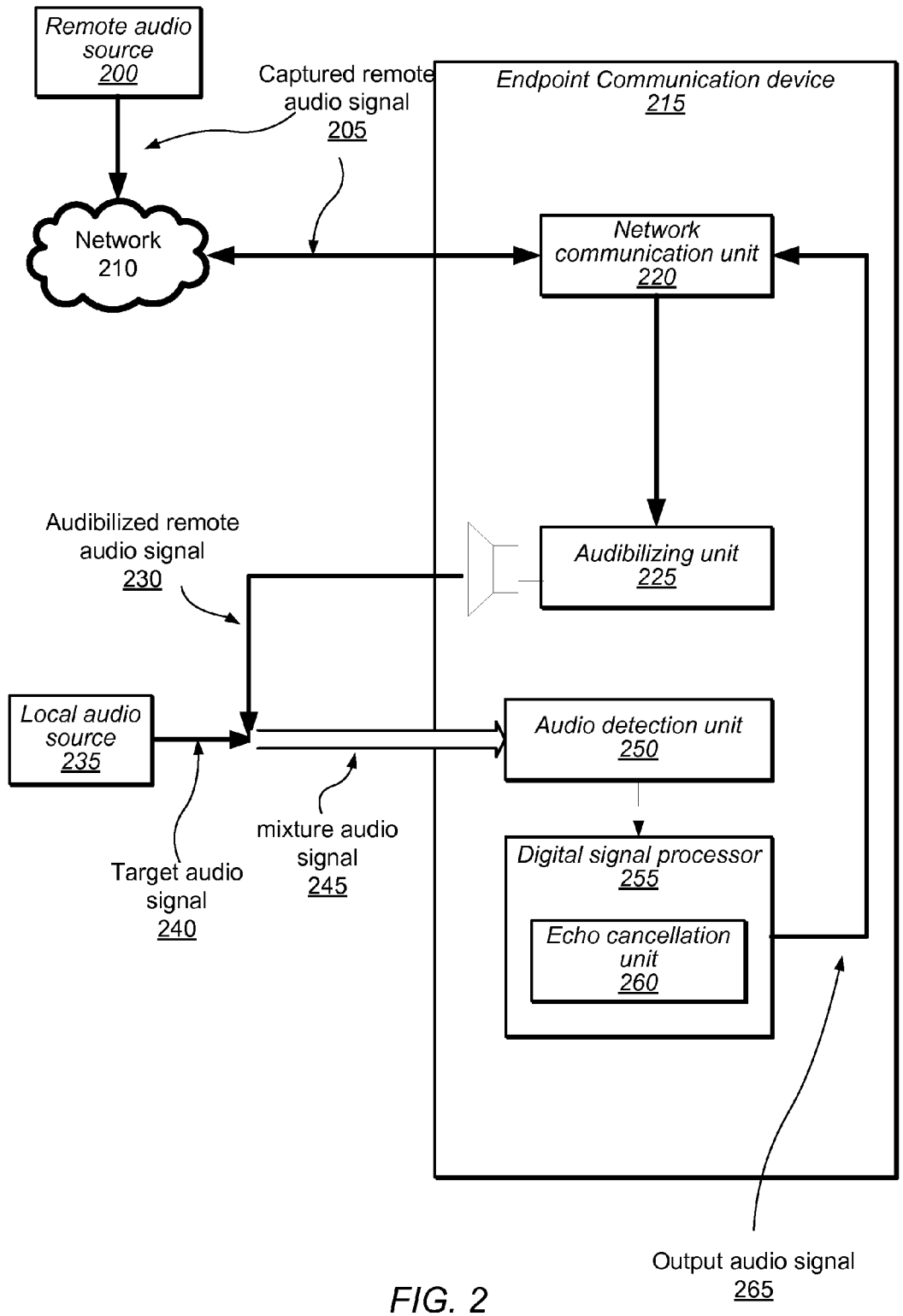
FIG. 2 is a flow diagram illustrating different components and flow of data in an audio communications systems that includes an endpoint communication device configured to perform echo cancellation according to some embodiments.

FIG. 2 is a flow diagram illustrating different components and flow of data in an audio communications systems that includes an endpoint communication device 215 configured to perform echo cancellation according to some embodiments.

According to FIG. 2, remote audio source 200 is used to capture a remote audio signal 205. For example, a remote user may speak into a microphone attached to a personal computer executing audio conferencing software and configured to capture the audio signal. The captured signal may be digitally processed (e.g., converted to a digital form) and sent to endpoint communication device 215 via network 210. Endpoint communication device 215 may be a telephone, personal computer, or another communication device.

Communication device 215 may receive captured remote audio signal 205 via network communication unit 220 (e.g., NIC). In response to network communication unit 220 receiving audio signal 205, audibilizing unit 225 may play signal 205, such as through a speaker, to produce audibilized remote audio signal 230. For example, audibilized remote audio signal 230 may be the sound of a remote user's voice corresponding to the captured remote audio signal 205.

According to the illustrated embodiment, audio detection unit 250, which may comprise a microphone, may capture a local audio signal such as mixture audio signal 245. In the illustrated example, mixture audio signal 245 is a mixture of the audibilized remote audio signal 230 and of a target audio signal 240 that is produced by local audio source 235. For example, local audio source 235 may be a local user speaking into the microphone and mixture audio signal 245 may be a mixture of the user's voice (target audio signal 240) and the audibilized remote audio signal 230 (e.g., remote user's voice).

In the illustrated embodiment, after or as audio detection unit 250 records the mixture audio signal 245, the captured mixture audio signal may be sent to digital signal processor 255. Digital signal processor 255 may perform such functions as converting mixture audio signal 245 from analog to digital form and/or manipulations such as mitigating echo effects in the captured mixture signal 245. For example, echo cancellation unit 260 may be used to perform a source separation technique as described below, and to thus generate output audio signal 265 that approximates target audio signal 240 of mixture audio signal 245.

In various embodiments, digital signal processor 255 and echo cancellation unit 260 may be implemented in hardware (e.g., as illustrate), in software (e.g., as in FIG. 1), or any combination thereof. In embodiments where some or all of digital signal processor 255 and/or echo cancellation unit 260 are implemented in software, endpoint communication device 215 may include one or more processors to execute functions of these software components.

In some embodiments, network communication unit 220 may transmit output audio signal 265 over network 210 or another network to a remote party. For example, the output audio signal 265 may be transmitted to remote source 200. In some embodiments, such as those employing multi-party audio conferencing software, the output audio signal 265 may be transmitted to multiple remote parties over network 210 and/or other networks. In such embodiments, audio signals captured from multiple remote parties may be received by network communication unit 220 and be audibilized by audibilizing unit 225 simultaneously. In this case, mixture audio signal 245 captured by audio detection unit 250 may include audibilized elements from multiple remote sources. Accordingly, in some such embodiments, echo cancellation unit 260 may be configured to approximate target audio signal 240 from mixture 245, such that audibilized elements from multiple remote sources are excluded from output signal 265.

Figure 3:
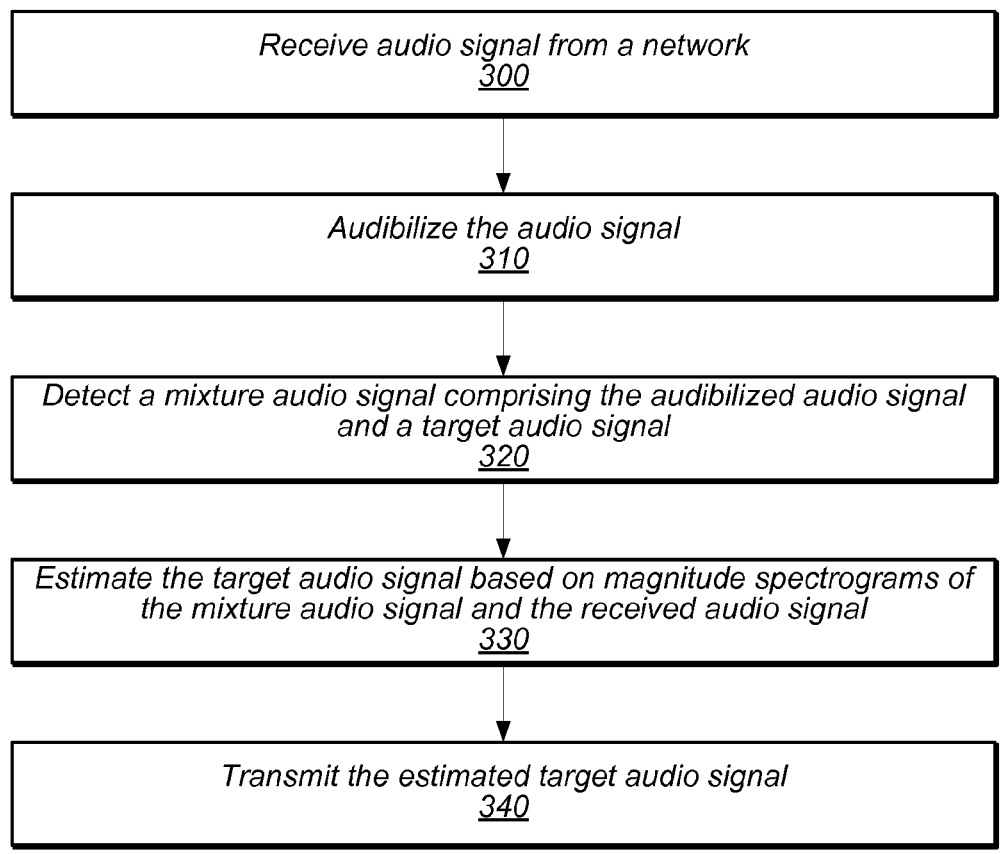
FIG. 3 is a flow diagram illustrating a method for echo cancellation using source decomposition, according to various embodiments.

FIG. 3 is a flow diagram illustrating a method for echo cancellation using source decomposition, according to various embodiments. In different embodiments, the method of FIG. 3 may be executed by an audio communication device such as 100 or 215.

According to the illustrated embodiment, the method may begin by receiving an audio signal from a network, as in 300. As described above, the network may be any of various types (e.g., IP, cellular, carrier wave etc.) and the audio signal may be encoded in various forms, including analog or digital form.

In the illustrated embodiment, once the audio signal is received, as in 300, it is audibilized, as in 310. Audibilizing the audio signal may include producing the sound, such as through one or more speakers.

According to FIG. 3, once the received audio signal is audibilized, in 320 a mixture audio signal is detected (e.g., through a microphone), where the mixture audio signal includes the audibilized audio signal and a target audio signal. For example, the target audio signal may be produced by a local source such as a person speaking In response to receiving the mixture audio signal, the illustrated method comprises estimating the target audio signal based on magnitude spectrograms of the mixture audio signal and the received audio signal, as in 330, and transmitting the estimated target audio signal, as in 340.

As used herein, the term magnitude spectrogram refers to data that describes how the spectral density of a signal varies over time and not necessarily to any particular visual representation of the spectrogram. In some embodiments, a magnitude spectrogram may be represented as a distribution of acoustic mass along the time/frequency axes. In such embodiments, the magnitude spectrogram may be considered a function of frequency and time and denoted as P(f,t) where f is frequency and t is time.

In various embodiments, an audio signal may be represented by magnitude spectral data and phase data. While spectral data describes the spectral density of the signal, phase data describes the frequency-dependent offset of the signal from a specified reference point in time. A magnitude spectrogram of a signal therefore represents only spectral data and not phase data.

To estimate the target audio signal as in 330, the magnitude spectrogram of the mixture may be determined and then modeled using spectral decomposition. In some embodiments, a spectral model of the sound mixture may assume that the observed mixture signal is comprised of at least two components, one being the unwanted echo (i.e., audibilized remote signal) and the other being the target sound to extract. For example, these two components may correspond to signals 230 and 240 of FIG. 2 respectively. Furthermore, the model may assume that the observed spectrogram of the sound mixture is a superposition of the echo and target spectrograms: P(f,t|echo) and P(f,t|target) respectively. Therefore, a general purpose formulation of a spectral model for the z sources of the mixture spectrogram, including the target and echo, may be represented by:

$$P(f, t) = \sum_z P(z)P(f, t \mid z) \tag{1}$$

To model the convolutive effects in the echo cancellation scenario, the model of (1) may be further refined to independently model multiple sub-bands of the mixture. For example, each sub-band signal P(t|f) may be modeled as a weighted summation of individual sub-band signals P(t|f,z) emanating from each source. In such embodiments, the mixture weights in the summation may be given by P(f|z) and the relative magnitudes of the sub-band signals by P(f). For such embodiments, the model of the mixture spectrogram may be given by:

$$P(f, t) = P(f) \sum_z P(z \mid f) P(t \mid f, z) \tag{2}$$

In some embodiments, to deal with convolutive effects on individual sources such as echoes, reverberation, and/or other forms of filtering, each sub-band signal may be modeled as a convolution itself. Thus, each sub-band signal, P(t|f,z) of a source z, may be modeled as a convolution of a magnitude sub-band source signal $P_S$(r|f,z) and an imposed channel filter $P_F$(t'|f,z) operating on that sub-band, where t'=t−r. Therefore, each sub-band signal may be given by:

$$P(t \mid f, z) = \sum_r P_S(r \mid f, z) P_F(t - r \mid f, z) \tag{3}$$

Thus, the convolutions in the model given by (3) are in the magnitude spectrum domain and are thus aimed at modeling only echoes and coloration effects. The coarse nature of the model permits it to be tolerant of dynamic filter changes while still being able to model mixtures well enough to extract the desired target source.

Figure 4:
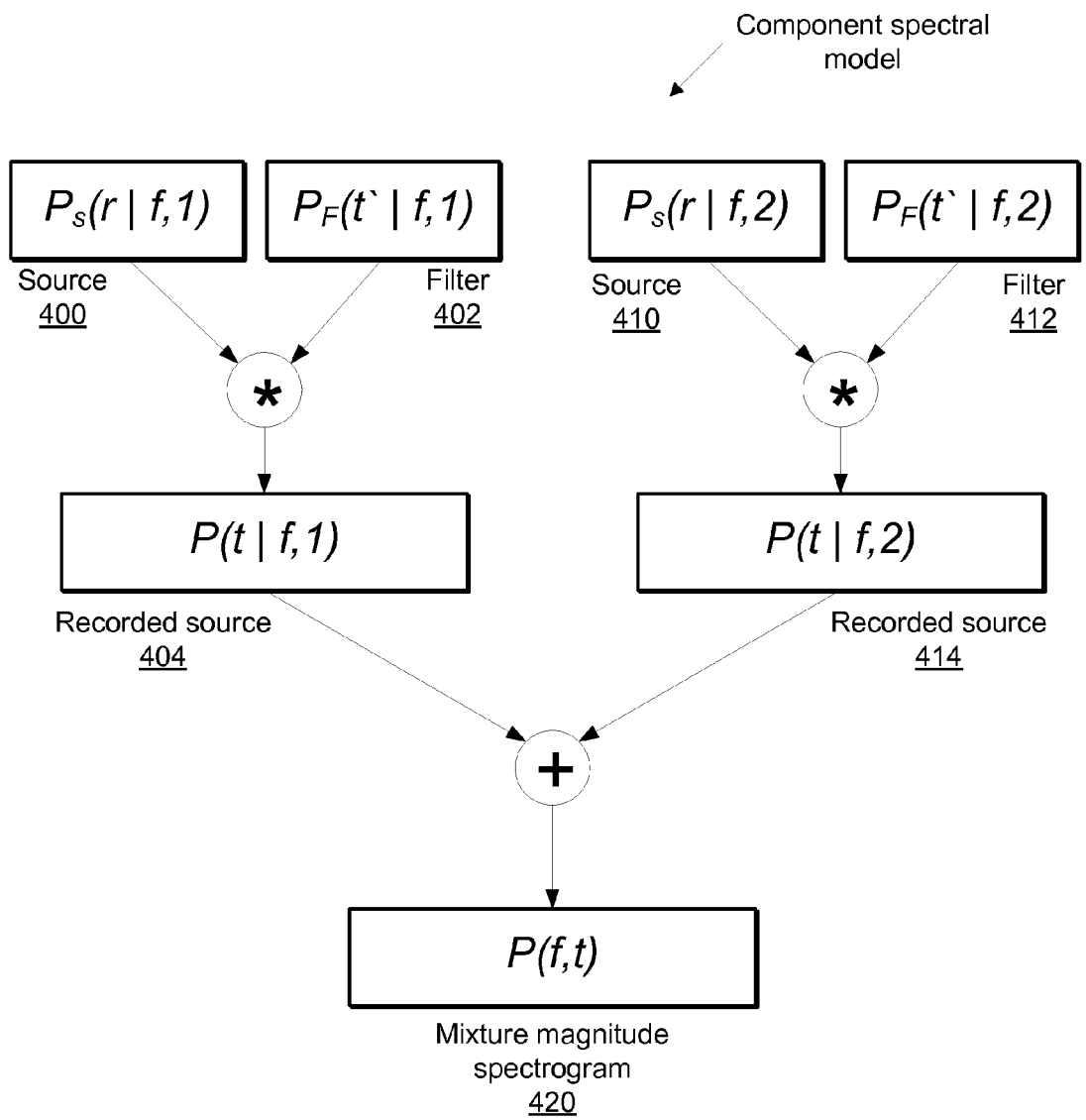
FIG. 4 illustrates various components of a magnitude spectrogram model, according to some embodiments.

FIG. 4 illustrates various elements of the multinomial mixture spectrogram model described above. The generative model of mixture spectrogram 420 includes the sum of the spectrograms of the echo and target sources (i.e., recorded sources 404 and 414). In turn, each of these source spectrograms is split into a collection of convolutions between the sub-bands of the spectrogram (e.g., sources 400 and 410) and a frequency specific impulse function (e.g., filters 402 and 412). Note that each of the elements of the generative model of FIG. 4 (400-420) are magnitude spectrograms. The model of FIG. 4 is given by:

$$P(f, t) = P(f) \sum_z P(z \mid f) \sum_r P_S(r \mid f, z) P_F(t - r \mid f, z) \tag{4}$$

Given a convolutive sound mixture P(f,t), it is possible to estimate the parameters of the model of (4). The parameters that are of most interest are the individual source distributions $P_S$(r|fz) since they correspond to the clean individual sources. The model comprises two latent variables (z and r). z represents the individual sound source and r represents an instant of time in the source distribution. t' represents an instant of time in the filter distribution. Given an instant of time t of the mixture spectrogram, the other two time variables may be related as t'=t−r. Therefore, given a specific t, the second latent variable can be either r or t'. Since the model is a latent variable model, in some embodiments, the known Expectation-Maximization (EM) algorithm may be configured and used to estimate the model parameters. For example, in some embodiments, the E-step of the algorithm, in terms of r, may be given by:

$$P(r, z \mid f, t) = \frac{P(z \mid f) P_S(r \mid f, z) P_I(t - r \mid f, z)}{\sum_z P(z \mid f) \sum_r P_S(r \mid f, z) P_F(t - r \mid f, z)} \quad (5)$$

In terms of t', the E-step may be given as:

$$P(t', z \mid f, t) = \frac{P(z \mid f) P_S(t - t' \mid f, z) P_I(t' \mid f, z)}{\sum_z P(z \mid f) \sum_{t'} P_S(t - t' \mid f, z) P_F(t' \mid f, z)} \quad (6)$$

The M-step of the EM algorithm may be given by:

$$P_S(r \mid f, z) = \frac{\sum_t P(f, t) P(r, z \mid f, t)}{\sum_r \sum_t P(f, t) P(r, z \mid f, t)} \quad (7)$$

$$P_F(t' \mid f, z) = \frac{\sum_t P(f, t) P(t', z \mid f, t)}{\sum_{t'} \sum_t P(f, t) P(t', z \mid f, t)}$$

$$P(z \mid f) = \frac{\sum_t P(f, t) \sum_r P(r, z \mid f, t)}{\sum_z \sum_t P(f, t) \sum_r P(r, z \mid f, t)}$$

$$P(f) = \frac{\sum_t P(f, t)}{\sum_f \sum_t P(f, t)}$$

A satisfactory parameter estimation may be reached by performing the iterative EM algorithm according to the formulations of (5)-(7) for a sufficient number of iterations. In some embodiments, the iterations themselves may be efficiently realized by performing them in the Fourier domain which may accelerate the implied convolution and cross-correlations in the E and M steps.

Figure 5:
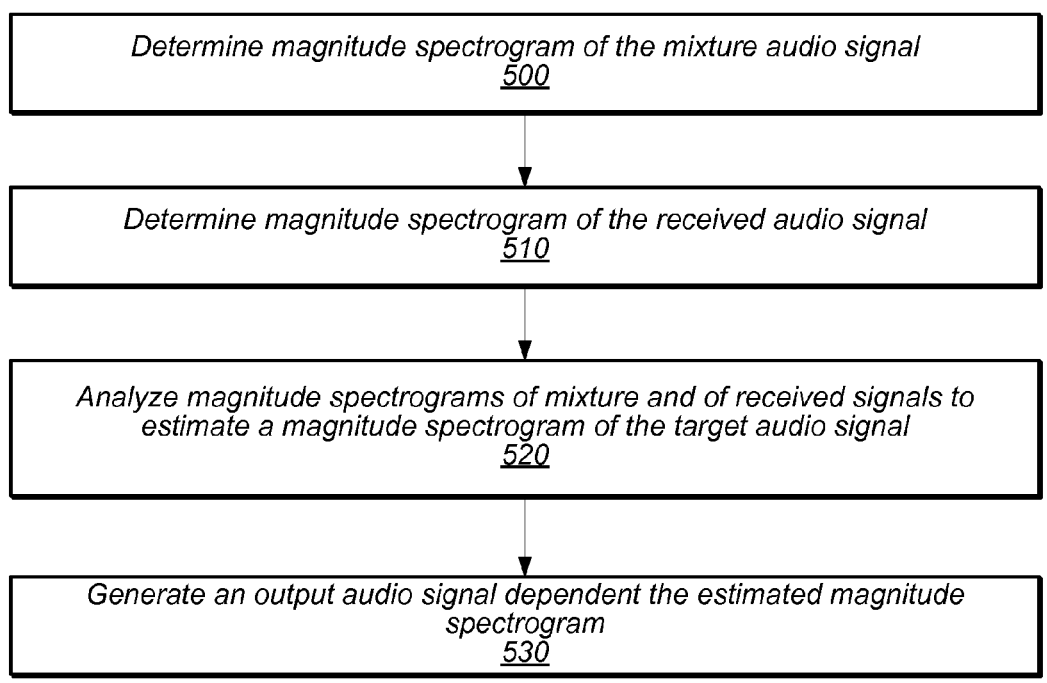
FIG. 5 is a flow diagram illustrating a method for estimating a target audio signal based on a source separation model described herein, according to some embodiments.

FIG. 5 is a flow diagram illustrating a method for estimating the target audio signal based on the source separation model described above, according to some embodiments. The illustrated method of FIG. 5 may correspond to step 330 and be performed by various components of a communication device, such as digital signal processor 255 and/or echo cancellation unit 260.

According to the illustrated embodiment, the method of FIG. 5 may begin by determining a magnitude spectrogram for the detected mixture audio signal (as in 500), and one for the received audio signal 205 (as in 510). In some embodiments, the magnitude spectrogram of each audio signal may be calculated as a matrix in which each column is the magnitude of the Fourier transform of a short segment of sound.

The magnitude spectrograms may then be analyzed according to the above model to estimate a magnitude spectrogram of the target audio signal, as in 530. In some embodiments, this may include fixing various portions of the model according to observed values and performing the EM estimation algorithm as outlined above.

According to some embodiments, source 400 may be set to the magnitude spectrogram of the received remote audio signal 205, which was determined in 510. The channel characteristics (e.g., transmission delay, channel filter, reverberation filter, etc.) of the received source 205 may be estimated as filter 402 and thus, recorded source 404 may approximate audibilized remote audio signal 230.

In some embodiments, the channel characteristics of the target source 240 may be modeled as filter 412. In various embodiments, filter 412 may take various forms that may depend on the assumed form of target source 410. However, the in many instances, the particular filter imposed on the target source may not be important since it does not impose a distortion that the model aims to remove. Therefore, in some embodiments, filter 412 may be fixed to be a collection of constant delays with unit gain for all frequencies. Such an assumption may simplify the model to make estimation of the remaining components easier.

In some embodiments, the analysis of 530 may include performing the EM algorithm according to the formulations of (5)-(7), and thus estimating source 410, which represents the magnitude spectrogram of the target audio signal.

According to the method of FIG. 5, the digital signal processor may then generate an output audio signal that is dependent on the estimated magnitude spectrogram, as in 530. For example, in some embodiments, an estimation of the target source signal may be generated by using masking through which the magnitude of the mixture spectrogram is replaced with P(t|f,2) and then inverted back to the time domain while using the original phase of the mixture signal.

Figure 6:
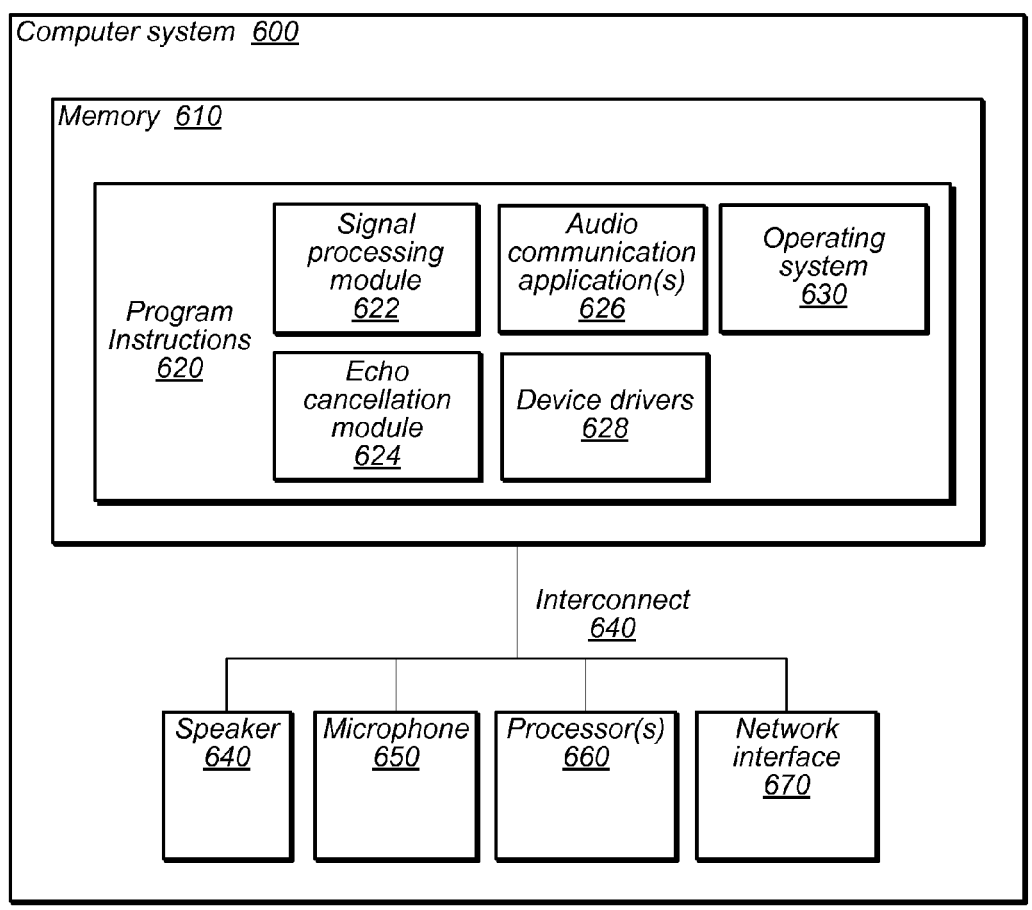
FIG. 6 is a block diagram illustrating a computer system configured to implement audio communication with echo cancellation as described herein, according to some embodiments.

FIG. 6 is a block diagram illustrating a computer system configured to implement audio communication with echo cancellation as described herein, according to some embodiments. Computer system 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 600 includes one or more processors 660, each of which may include multiple cores, any of which may be single or multi-threaded. The computer system 600 may also include one or more audibilizing units (such as speaker 640), audio detection units (such as microphone 650), and network communication devices (such as network interface 670). In the illustrated embodiment, network interface 670 may be used to send and/or receive audio signal data over a network (e.g., IP network), speaker 640 may be used to audibilize audio signals received by network interface 670, and microphone 650 may be used to capture local audio signals, which may include audio signals audibilized by speaker 640. Computer system 600 also includes one or more memories 610 (e.g., one or more of cache, SRAM, DRAM, RDRAM, EDO RAM, DDR 10 RAM, SDRAM, Rambus RAM, EEPROM, etc.). In various embodiments, computer system 600 may include fewer or additional components not illustrated in FIG. 6 (e.g., displays, persistent storage devices, video cards, audio cards, peripheral devices, other network interfaces such as an ATM interface, an Ethernet interface, a Frame Relay interface, etc.)

The speaker 640, microphone 650, processors 660, network interface 670, and memory 610 may be coupled to system interconnect 630. System memory 610 may contain program instructions 620 that are executable by processor(s) 660. In various embodiments, program instructions 620 may be encoded in platform native binary, any interpreted language such as Java™ byte-code, or in any other language such as C/C++, Java™, etc or in any combination thereof.

In the illustrated embodiment, program instructions 620 include program instructions executable to implement signal processing module 622, which may be configured to perform various signal processing functions, such as converting captured analog signal to a digital format and/or adjusting various characteristics of a given audio signal. In some embodiments, program instructions 620 may include instructions executable to implement echo cancellation module 624, which is usable to implement echo cancellation using magnitude spectrograms, as described herein. In other embodiments, echo cancellation module 624 may be implemented as part of signal processing module 622. Although signal processing module 622 and echo cancellation module 624 are implemented as program instructions in the illustrated embodiment, in other embodiments, one or more of these may be implemented in part or wholly by hardware components.

According to the illustrated embodiment, program instructions 620 may further include instructions executable to implement one or more audio communication applications 626, such as audio/video conferencing, voice over IP (VoIP) applications, or others. Such applications may be configured to facilitate capturing, sending and receiving audio data between an application user and one or more remote parties over a network, such as by using network interface 670.

Program instructions 620 also include device drivers 628 usable by software to interact with various devices, such has speaker 640, microphone 650, and/or network interface 670. Device drivers 628 may be implemented separately or as part of one or more operating systems 630, such as Windows™, Solaris™, Linux, etc.

Any or all of program instructions 620, including echo cancellation module 624 may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. For example, the echo cancellation techniques described herein may be applied to other, non-audio, time-series data where a signal from one entity is received by a second entity, transformed into a detectable form, detected along with another signal by the second entity, and transmitted back to the first entity such that the system is subject to an echo of the time-series data. It is intended that the following claims be interpreted to embrace all such variations and modifications.

What is claimed:

1. A method, comprising:
receiving a remote audio signal from a network;
detecting a mixture audio signal captured by an audio detection unit and comprising a target audio signal and an echo audio signal, the echo audio signal corresponding to the remote audio signal;
estimating the target audio signal, including:
determining a magnitude spectrogram of the mixture audio signal as captured by the audio detection unit;
determining a magnitude spectrogram of the remote audio signal;
estimating a magnitude spectrogram of the target audio signal from the magnitude spectrogram of the mixture audio signal and the magnitude spectrogram of the remote audio signal, the estimating performed according to a spectral model in which multiple sub-bands of the mixture audio signal that correspond to echoes and at least one other coloration effect are independently modeled to impose an individual filter on each of those sub-bands and to extract the magnitude spectrogram of the target audio signal from the magnitude spectrogram of the mixture audio signal; and
generating an output audio signal that estimates the target audio signal based on the estimated magnitude spectrogram of the target audio signal.

2. The method of claim 1, wherein each of the magnitude spectrograms describes a spectral density of the corresponding audio signal and not phase information.

3. The method of claim 2, wherein generating the output audio signal is based on both the estimated magnitude spectrogram of the target audio signal and phase data of the mixture audio signal.

4. The method of claim 1, wherein the spectral model comprises a plurality of magnitude spectral components, including said multiple sub-bands, that are combined to represent the magnitude spectrogram of the mixture audio signal.

5. The method of claim 4, wherein estimating the magnitude spectrogram of the target audio signal includes estimating each said magnitude spectral component by performing an Expectation-Maximization algorithm.

6. The method of claim 4, wherein the spectral model comprises filtering components that are convolved with sound source components.

7. The method of claim 4, wherein one of the magnitude spectral components is estimated by the magnitude spectrogram of the remote audio signal.

8. The method of claim 1, wherein the at least one other coloration effect comprises at least one of reverberation, transmission delay, or an effect of a channel through which the remote audio signal was received.

9. A computer-readable memory storing instructions thereon that are executable on one or more processors to implement operations comprising:
receiving an audio signal from a network;
detecting a mixture audio signal captured by a microphone and comprising both a target audio signal and an echo audio signal, the echo audio signal corresponding to the audio signal received from the network;
estimating the target audio signal, including:
determining a magnitude spectrogram of the mixture audio signal as captured by the microphone;
determining a magnitude spectrogram of the audio signal received from the network;
estimating a magnitude spectrogram of the target audio signal from the magnitude spectrogram of the mixture audio signal and the magnitude spectrogram of the audio signal received from the network, the estimating performed according to a spectral model in which multiple sub-bands of the mixture audio signal that correspond to echoes and at least one other coloration effect are independently modeled to impose an individual filter on each of those sub-bands and to extract the magnitude spectrogram of the target audio signal from the magnitude spectrogram of the mixture audio signal, the individual filter imposed on one said sub-band being changeable independent of another said individual filter; and generating an output audio signal that estimates the target audio signal based on the estimated magnitude spectrogram of the target audio signal.

10. The computer-readable memory of claim 9, wherein each of the magnitude spectrograms describes a spectral density of the corresponding audio signal and not phase information.

11. The computer-readable memory of claim 10, wherein generating the output audio signal is based on both the estimated magnitude spectrogram of the target audio signal and phase data of the mixture audio signal.

12. The computer-readable memory of claim 9, wherein the spectral model comprises a plurality of magnitude spectral components, including said multiple sub-bands, that are combined to represent the magnitude spectrogram of the mixture audio signal, each of the magnitude spectral components being associated with a weight indicative of how much a spectral component is determined to affect the magnitude spectrogram of the mixture audio signal.

13. The computer-readable memory of claim 12, wherein estimating the magnitude spectrogram of the target audio signal includes estimating each said magnitude spectral component by performing an Expectation-Maximization algorithm.

14. The computer-readable memory of claim 12, wherein one of the magnitude spectral components is estimated by the magnitude spectrogram of the audio signal received from the network.

15. The computer-readable memory of claim 9, wherein detecting a mixture audio signal comprises receiving the mixture audio signal from over the network.

16. An apparatus, comprising:
a network communication unit configured to send and receive audio signals across a network;
a processor configured to implement operations comprising:
using the network communication unit to receive a remote audio signal from the network;
detecting a mixture audio signal captured by an audio detection unit and comprising both a target audio signal and an echo audio signal, the echo audio signal corresponding to the remote audio signal;
estimating the target audio signal by:
determining a magnitude spectrogram of the mixture audio signal as captured by the audio detection unit;
determining a magnitude spectrogram of the remote audio signal;
estimating a magnitude spectrogram of the target audio signal using the magnitude spectrogram of the mixture audio signal and the magnitude spectrogram of the remote audio signal, the estimating performed according to a spectral model in which multiple sub-bands of the mixture audio signal that correspond to echoes and at least one other coloration effect are independently modeled to impose an individual filter on each of those sub-bands and to extract the magnitude spectrogram of the target audio signal from the magnitude spectrogram of the mixture audio signal; and
generating an output audio signal that estimates the target audio signal based on the estimated magnitude spectrogram of the target audio signal.

17. The apparatus of claim 16, further comprising:
an audibilizing unit; and
the audio detection unit;
wherein the operations further comprise:
in response to receiving the remote audio signal from the network, audibilizing the remote audio signal using the audibilizing unit; and
detecting the mixture audio signal using the audio detection unit, wherein the echo audio signal corresponds to an audibilized version of the remote audio signal as captured by the audio detection unit.

18. The apparatus of claim 16, wherein the spectral model comprises a plurality of magnitude spectral components, including the multiple sub-bands, that are combined to produce the magnitude spectrogram of the mixture audio signal.

19. The apparatus of claim 18, wherein estimating the magnitude spectrogram of the target audio signal includes estimating each said magnitude spectral component by performing an Expectation-Maximization algorithm.

20. The apparatus of claim 18, wherein one of the magnitude spectral components is estimated by the magnitude spectrogram of the remote audio signal.

* * * * *